Oct. 27, 1942.  H. VEYDER  2,299,773
SEAT HOLDING MEANS
Filed May 6, 1939
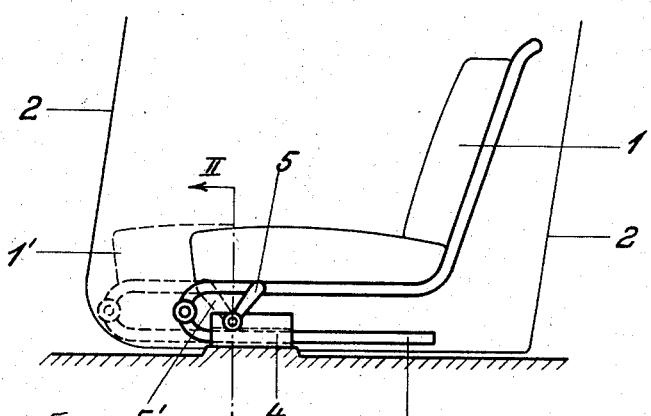
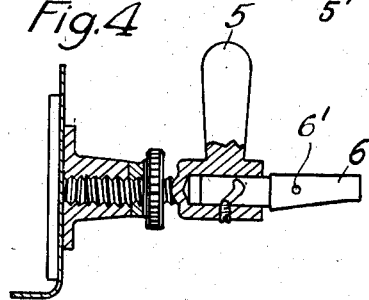
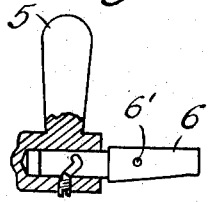
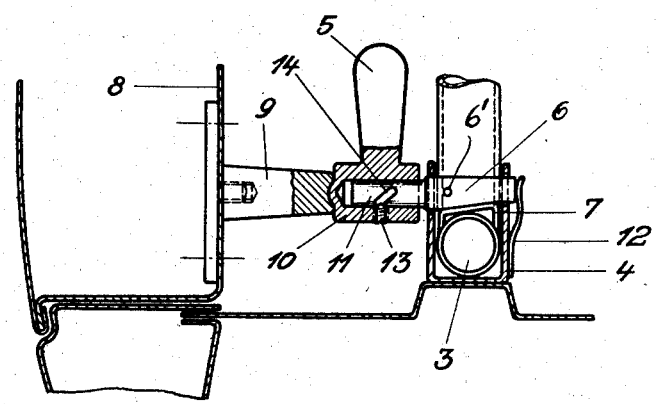
Inventor
HANS VEYDER
By
Attorneys Patented Oct. 27, 1942

2,299,773

UNITED STATES PATENT OFFICE 2,299,773

SEAT HOLDING MEANS

Hans Veyder, Stuttgart-Degerloch, Germany; vested in the Alien Property Custodian Application May 6, 1939, Serial No. 272,115
In Germany May 7, 1938

8 Claims. (Cl. 155—14)

This invention relates to improved seat holding means and has for an object improving such means for use particularly on power or other vehicles having doors for permitting ingress and egress of the user thereof.

Another object is to provide such a device, whether it be a clamp, rack and latch or other holding means, which is controlled by the position of the door.

Another object is to provide such a holding means which is normally biased to ineffective condition as by a spring but which is moved to effective condition by the door of the vehicle.

A further object is to provide operating devices for seat holding means which in effective position react against the door so that when the door is opened the seat holding means is freed so that the user is free to reposition the seat as he may desire.

Another object is to provide a door influenced seat holding device which can at will be released by hand even when the door is closed.

A further object is to provide such a manual releasing device which is located between the seat holding means and the door.

Another object is to provide such a releasing means which is capable of use also as an adjusting device.

Another object is to provide a seat holding means which so cooperates with the door of a vehicle as to avoid rattling thereof.

The present invention is particularly useful in connection with rear engine motor vehicles in which it is frequently desirable to move the front seat or seats far forward and to a position beyond which it is possible to place the door, the forward location of which is limited by the presence of the fenders and/or other necessary parts of the vehicle. In such vehicles it is therefore necessary for the driver to move the seat rearwardly before he can exit from the vehicle. In the case of seat holding means as used heretofore it was necessary to manually release and reapply the holding means, which is tiring and time consuming and rather inconvenient in view of the usual location of the manipulative means near the floor of the vehicle. With the use of the present invention the user merely opens the door which automatically releases the seat holding means so that the seat can be pushed back to permit the user to leave the vehicle.

Other objects will appear from the following description of an illustrative embodiment of the invention taken together with the attached drawing wherein:

Fig. 1 shows in elevation a seat construction illustrating the invention; whereas Fig. 2 shows on enlarged scale a cross-section along the line II—II of Fig. 1, looking in the direction of the arrows.

Figs. 3 and 4 illustrate modifications.

In Fig. 1 the seat, which is illustrated as of the hinged type, is indicated by numeral 1 as located in its rearward position, in which entrance to and exit from the vehicle is possible, and numeral 1' shows in dotted lines the location of the seat in driving position. The line 2 outlines the edges of the door opening.

3 indicates a seat supporting tube or bar of any desirable construction which is supported for longitudinal adjustment in a channeled supporting seat 4 rigidly fixed upon the floor of the vehicle.

The construction is such that when the door is closed the bar 3 is clamped in position so that the seat is fixed in the desired position such as that indicated at 1.

This clamping in the form of the invention illustrated may be effected by a wedge clamping member 6, shown as mounted in openings in the channeled supporting seat 4, bearing directly on the tube or bar 3 or applying a clamping force thereon through an intermediate member such as the clamping shoe 7 which has a sloping surface fitting against and cooperating with the wedge 6.

By means of the abutment 9 on the door 8 acting through the hub 10 and the cylindrical extension 11 of the wedge 6 the latter is moved to clamping position against the action of spring 12. The hub 10 is shown connected with the extension 11 by means of the inner end of the screw 13 cooperating with the helical groove 14 in the cylindrical extension 11. The members 6, 11 may be held against excessive movement to the left (Fig. 2) by means of the cross pin 6'.

As a result of this construction it is clear that if the lever 5 of the hub 10 is swung forwardly as to the dotted line position 5', shown in Fig. 1, the cylindrical extension 11 may move toward the left (Fig. 2) thus releasing the wedge 6. Assuming that the operator desires to leave the vehicle, he merely opens the door 8 which causes abutment 9 to be withdrawn from the hub 10. This releases the seat for longitudinal sliding movement as the spring 12 moves the wedge 6 to the left (Fig. 2). Therefore, the operator may simply push the seat rearwardly so that he can easily and conveniently leave the vehicle. Upon re-entering the vehicle the operator may first slide the seat forwardly to the desired position and will then close the door. Thereupon the engagement of abutment 9 with hub 10 will cause the wedge 6 to be moved to the right (Fig. 2), and cause wedging and locking of the seat in the position to which he has adjusted it. In the alternative, the operator may first turn the hub 10 by means of handle 5 counterclockwise (Fig. 1). He may thereupon close the door, adjust the seat forwardly to the desired position and then move the handle 5 clockwise to cause clamping of the seat in position. A special construction may consist therein that the groove 14 is formed with a dwell or reverse slope at the clamp applied position of lever 5 so that the hub 10 is held in the clamping position through the stress applied thereon. The slight modification is illustrated in Fig. 3.

If the groove 14 is formed as a helix, or if the parts 10 and 11 are connected by ordinary screw threads, they will serve also as an adjusting means to take up for wear of the clamping parts. This same result can be accomplished by so constructing the abutment 9 that it is adjustable in length as by forming it of two parts threadably connected as shown in Fig. 4. This would provide the necessary adjustment to compensate for variations in manufacture and for wear and loosening of the parts in use.

Whereas the wedge 6 is shown as serving to clamp only one of the supporting bars or tubes 3 it is obvious that the wedge 6 might, if found desirable, be formed with an extension to the other side of the seat and be there formed with a similar wedge and clamping mechanism to provide clamping of both sides of the seat.

The device according to the invention operates in such a manner that upon opening the door 8, when the abutment 9 becomes ineffective, the wedge 6 is pressed to the left by spring 12 so that the pressure of the wedge 6 upon the sloping surface of the shoe 7 is removed. The seat may then be slid to any desired position where it will be held in place, if, upon closing of the door, the abutment 9 again becomes effective. If now for any reason a re-adjustment of the seat is desired, the lever 5 is moved forwardly which, if the groove 14 is formed with a dwell or reverse slope as described above, can only take place if the parts are first sprung apart slightly, whereupon the hub 10 moves to the right relatively to the wedge 6 so that the spring 12 may press the wedge 6 to the left so as to disengage the clamping means. Upon returning the lever 5 rearwardly wedge 6 is again pressed to the right through the screw action of 10 relative to 11 and thus clamp the seat in place. Hereby the various parts are placed under stress so that automatic loosening of the lever 5 while driving cannot occur.

The invention is applicable to holding means of various types not only with such where clamping takes place but also where holding is effected by means of a dog engaging a rack bar.

The use of the invention is not limited to power vehicles but may be used on vehicles of all types wherever a re-positioning of the seat is desired for facilitating entry to or exit from the vehicle.

While I have herein shown and described only an illustrative embodiment of my invention it is pointed out that various changes and modifications therein may be made without departing from the invention as set forth in the following claims.

I claim:

1. In a vehicle having a body including a hinged door, the combination of a seat, means for supporting said seat for adjustment longitudinally of the vehicle, means for clamping said seat in any position to which it has been moved and means operated by said door for actuating said clamping means to clamping position.

2. In a vehicle having a body including a hinged door, the combination of a seat, means for slidably supporting said seat for adjustment longitudinally of the vehicle, means for clamping said seat in any position to which it has been moved and means operated by closure of the door for actuating said clamping means to clamping position, together with manually actuatable means for releasing said clamping means.

3. In a vehicle having a body including a hinged door, the combination of a seat, means for slidably supporting said seat for adjustment longitudinally of the vehicle, means for clamping said seat in any position to which it has been moved and means operated by said door for determining the effectivity of said clamping means, said means including an abutment on the door which when the door is closed engages said last clamping means and moves it to effective position.

4. The combination of claim 3 in which said clamping means includes an adjusting member.

5. The combination of claim 3 in which said clamping means includes an adjusting member which may be operated by hand to release said clamping means even when the door is closed.

6. The combination of claim 3 in which said clamping means includes a helically interconnected adjusting device one element of which may be rotated relatively to the other for adjusting the relation between said abutment and said clamping means.

7. In a power vehicle having a body including a hinged door and having a seat, means for supporting said seat for sliding adjustment longitudinally of the vehicle and means for clamping said seat in the position to which it has been adjusted, spring means for biasing said clamping means toward ineffective position and means actuated by said door for moving said clamping means against said spring means to cause said clamping means to become effective.

8. In a power vehicle having a body including a hinged door and having a seat, means for supporting said seat for sliding adjustment longitudinally of the vehicle and means for clamping said seat in the position to which it has been adjusted, spring means for biasing said clamping means toward ineffective position and means actuated by said door for moving said clamping means against said spring means to cause said clamping means to become effective together with manually actuatable means for releasing said holding means.

HANS VEYDER.